US012665746B2

(12) United States Patent (10) Patent No.: US 12,665,746 B2

Bouazizi et al. (45) Date of Patent: Jun. 23, 2026

---

(54) PROTECTING AUGMENTED REALITY CALL CONTENT

(71) Applicant: QUALCOMM Incorporated, San Diego, CA (US)

(72) Inventors: Imed Bouazizi, Frisco, TX (US); Michel Adib Sarkis, San Diego, CA (US); Thomas Stockhammer, Bergen (DE)

(73) Assignee: QUALCOMM INCORPORATED, San Diego, CA (US)

( * ) Notice: Subject to any disclaimer, the term of this patent is extended or adjusted under 35 U.S.C. 154(b) by 9 days.

(21) Appl. No.: 18/407,996

(22) Filed: Jan. 9, 2024

(65) Prior Publication Data

US 2024/0235816 A1 Jul. 11, 2024

Related U.S. Application Data

(60) Provisional application No. 63/479,520, filed on Jan. 11, 2023.

(51) Int. Cl.
| | |
|---|---|
| *H04L 9/08* | (2006.01) |
| *G06F 21/10* | (2013.01) |
| *G06F 21/44* | (2013.01) |

(52) U.S. Cl.
CPC ............ *H04L 9/0816* (2013.01); *G06F 21/44* (2013.01)

(58) Field of Classification Search
CPC ............................... H04L 9/0816; G06F 21/44
See application file for complete search history.

(56) References Cited

U.S. PATENT DOCUMENTS

| | | | | |
|---|---|---|---|---|
| 6,931,531 | B1* | 8/2005 | Takahashi | ........ H04N 21/42646 |
| | | | | 375/E7.009 |
| 7,415,440 | B1* | 8/2008 | Fransdonk | .............. G06F 21/10 |
| | | | | 705/50 |
| 8,954,740 | B1* | 2/2015 | Moscaritolo | .......... H04L 63/065 |
| | | | | 380/278 |
| 2001/0053222 | A1* | 12/2001 | Wakao | ................. H04N 21/835 |
| | | | | 375/E7.076 |

(Continued)

FOREIGN PATENT DOCUMENTS

KR 20190069759 A 6/2019

OTHER PUBLICATIONS

International Search Report and Written Opinion—PCT/US2024/011046—ISA/EPO—Apr. 19, 2024.

(Continued)

*Primary Examiner* — Oleg Survillo

(74) *Attorney, Agent, or Firm* — Shumaker & Sieffert, P.A.

(57) ABSTRACT

An example device for participating in an augmented reality (AR) call includes a memory configured to store AR data; and a processing system comprising one or more processors implemented in circuitry, the processing system being configured to: receive a scene description for an AR call, the scene description including data representing one or more digital assets for the AR call that are encrypted; request authorization to access the one or more digital assets for the AR call that are encrypted; in response to requesting authorization, receive data for a key to be used to decrypt the one or more digital assets; decrypt the one or more digital assets using the data for the key to form decrypted digital assets; and render the decrypted digital assets during the AR call.

25 Claims, 7 Drawing Sheets

(56) References Cited

U.S. PATENT DOCUMENTS

| | | | | |
|---|---|---|---|---|
| 2003/0028397 A1* | 2/2003 | Tagashira | ........... | H04N 21/2541 |
| | | | | 375/E7.009 |
| 2014/0059604 A1* | 2/2014 | Kim | ......................... | G09G 5/14 |
| | | | | 725/38 |
| 2014/0136726 A1 | 5/2014 | Van Wie et al. | | |
| 2015/0026452 A1* | 1/2015 | Roelse | ...................... | H04L 9/14 |
| | | | | 713/150 |
| 2015/0106472 A1* | 4/2015 | Viveganandhan | ........................... | |
| | | | | H04N 21/2183 |
| | | | | 709/217 |
| 2017/0316186 A1* | 11/2017 | Breitenfeld | ......... | G06F 21/6218 |
| 2017/0329937 A1* | 11/2017 | Choi | ........................ | G06T 1/005 |
| 2022/0005254 A1 | 1/2022 | Gladkov et al. | | |
| 2022/0108519 A1* | 4/2022 | Wang | ...................... | G06T 15/20 |
| 2022/0217452 A1* | 7/2022 | Wang | ........................ | H04N 21/85 |
| 2022/0224974 A1* | 7/2022 | Claypool | ............ | H04L 63/0457 |
| 2022/0377080 A1 | 11/2022 | Lyons | | |
| 2023/0102054 A1* | 3/2023 | Fasogbon | ............ | H04N 19/597 |
| | | | | 345/473 |
| 2023/0254300 A1* | 8/2023 | Silverstein | .............. | G06F 21/30 |
| | | | | 726/10 |
| 2024/0235816 A1* | 7/2024 | Bouazizi | .............. | H04L 9/0816 |

OTHER PUBLICATIONS

Schulzrinne H., et al., "RTP: A Transport Protocol for Real-Time Applications", Network Working Group, Request for Comments: 3550, No. 1889, Jul. 2003, XP003022794, The Internet Society, pp. 1-89.

The Khronos: "glTF™ 2.0 Specification", 3D Formats Working Group, Version 2.0.1, Oct. 11, 2021, 199 Pages.

* cited by examiner

ESTABLISH XR SESSION                                   250

RECEIVE SCENE DESCRIPTION
FOR XR SESSION                                          252

DETERMINE ENCRYPTED
DIGITAL ASSETS FROM SD                                 254

REQUEST AUTHORIZATION TO
ACCESS ENCRYPTED ASSETS                                256

RECEIVE DECRYPTION KEY                                 258

DECRYPT ENCRYPTED ASSETS
USING DECRYPTION KEY                                   260

RENDER AND DISPLAY ASSETS                              262

RECEIVE REQUEST FROM UE2
TO ACCESS ASSETS OF UE1 ⟋280

SEND REQUEST TO UE1 ⟋282

RECEIVE AUTHORIZATION
FROM UE1 ⟋284

RECEIVE DECRYPTION KEY
FROM UE1 ⟋286

SEND DECRYPTION KEY TO UE2 ⟋288

PROTECTING AUGMENTED REALITY CALL CONTENT

This application claims the benefit of U.S. Provisional Application No. 63/479,520, filed Jan. 11, 2023, the entire contents of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for protecting digital assets exchanged during an augmented reality (AR) call. Participants in an AR call may have digital assets that they wish to protect, such as a digital avatar, an outfit for the digital avatar, items held by or used as decorations for the digital avatar, or the like. While the participants may wish to present these digital assets in a virtual scene for the AR call, the participants may wish to prevent others from stealing the digital assets. Theft of digital assets may infringe intellectual property or may be used by a malicious user to impersonate the user the digital assets were stolen from. The techniques of this disclosure may be used to protect digital assets used in an AR call from theft.

In one example, a method of participating in an augmented reality (AR) call includes: receiving a scene description for an AR call, the scene description including data representing one or more digital assets for the AR call that are encrypted; requesting authorization to access the one or more digital assets for the AR call that are encrypted; in response to requesting authorization, receiving data for a key to be used to decrypt the one or more digital assets; decrypting the one or more digital assets using the data for the key to form decrypted digital assets; and rendering the decrypted digital assets during the AR call.

In another example, a device for participating in an augmented reality (AR) call includes: a memory configured to store AR data; and a processing system comprising one or more processors implemented in circuitry, the processing system being configured to: receive a scene description for an AR call, the scene description including data representing one or more digital assets for the AR call that are encrypted; request authorization to access the one or more digital assets for the AR call that are encrypted; in response to requesting authorization, receive data for a key to be used to decrypt the one or more digital assets; decrypt the one or more digital assets using the data for the key to form decrypted digital assets; and render the decrypted digital assets during the AR call.

In another example, a device for participating in an augmented reality (AR) call includes: means for receiving a scene description for an AR call, the scene description including data representing one or more digital assets for the AR call that are encrypted; means for requesting authorization to access the one or more digital assets for the AR call that are encrypted; means for, in response to requesting authorization, receiving data for a key to be used to decrypt the one or more digital assets; means for decrypting the one or more digital assets using the data for the key to form decrypted digital assets; and means for rendering the decrypted digital assets during the AR call In another example, a computer-readable storage medium has stored thereon instructions that cause a processor of a device for participating in an augmented reality (AR) call to receive a scene description for an AR call, the scene description including data representing one or more digital assets for the AR call that are encrypted; request authorization to access the one or more digital assets for the AR call that are encrypted; in response to requesting authorization, receive data for a key to be used to decrypt the one or more digital assets; decrypt the one or more digital assets using the data for the key to form decrypted digital assets; and render the decrypted digital assets during the AR call.

In another example, a method of participating in an augmented reality (AR) call includes receiving a request, from a first client device participating in the AR call, to access one or more protected digital assets of a second client device participating in the AR call; receiving, from the second client device, authorization to provide access to the one or more protected digital assets to the first client device; and in response to the authorization from the second client device, providing, to the first client device, a decryption key associated with the one or more protected digital assets.

In another example, a device for participating in an augmented reality (AR) call includes: a memory configured to store decryption keys; and a processing system comprising one or more processors implemented in circuitry, the processing system being configured to: receive a request, from a first client device participating in the AR call, to access one or more protected digital assets of a second client device participating in the AR call; receive, from the second client device, authorization to provide access to the one or more protected digital assets to the first client device; and in response to the authorization from the second client device, provide, to the first client device, a decryption key of the decryption keys, the decryption key being associated with the one or more protected digital assets.

In another example, a device for participating in an augmented reality (AR) call includes means for receiving a request, from a first client device participating in the AR call, to access one or more protected digital assets of a second client device participating in the AR call; means for receiving, from the second client device, authorization to provide access to the one or more protected digital assets to the first client device; and means for, in response to the authorization from the second client device, providing, to the first client device, a decryption key associated with the one or more protected digital assets.

In another example, a computer-readable storage medium has stored thereon instructions that cause a processor of a device for participating in an augmented reality (AR) call to receive a request, from a first client device participating in the AR call, to access one or more protected digital assets of a second client device participating in the AR call; receive, from the second client device, authorization to provide access to the one or more protected digital assets to the first client device; and in response to the authorization from the second client device, provide, to the first client device, a decryption key of the decryption keys, the decryption key being associated with the one or more protected digital assets.

In another example, a method of retrieving digital assets for an augmented reality (AR) call includes: receiving a scene description for an AR call, the scene description including data representing one or more digital assets for the AR call; requesting authorization to access the one or more digital assets for the AR call; in response to requesting authorization, receiving data for the one or more digital assets; and rendering the one or more digital assets during the AR call.

In another example, a device for retrieving digital assets for an augmented reality (AR) call includes: a memory configured to store AR data; and a processing system comprising one or more processors implemented in circuitry, the processing system being configured to: receive a scene description for an AR call, the scene description including data representing one or more digital assets for the AR call; request authorization to access the one or more digital assets for the AR call; and in response to requesting authorization, receive data for the one or more digital assets; and render the one or more digital assets during the AR call.

In another example, a device for sending digital assets for an augmented reality (AR) call, the device comprising: a memory configured to store one or more assets of AR data from a first device participating in an AR call; and a processing system comprising one or more processors implemented in circuitry, the processing system being configured to: receive the one or more assets of the AR data from the first device participating in the AR call; receive a request to provide the one or more assets of the AR data to a second device participating in the AR call; and in response to the request, send the one or more assets of the AR data to the second device participating in the AR call.

In another example, a device for participating in an augmented reality (AR) call includes: a memory configured to store decryption keys; and a processing system comprising one or more processors implemented in circuitry, the processing system being configured to: receive a request, from a first client device participating in the AR call, to access one or more protected digital assets of a second client device participating in the AR call; receive, from the second client device, authorization to provide access to the one or more protected digital assets to the first client device; and in response to the authorization from the second client device, provide, to the first client device, a decryption key of the decryption keys, the decryption key being associated with the one or more protected digital assets.

The details of one or more examples are set forth in the accompanying drawings and the description below. Other features, objects, and advantages will be apparent from the description and drawings, and from the claims.

DETAILED DESCRIPTION

Figure 1:
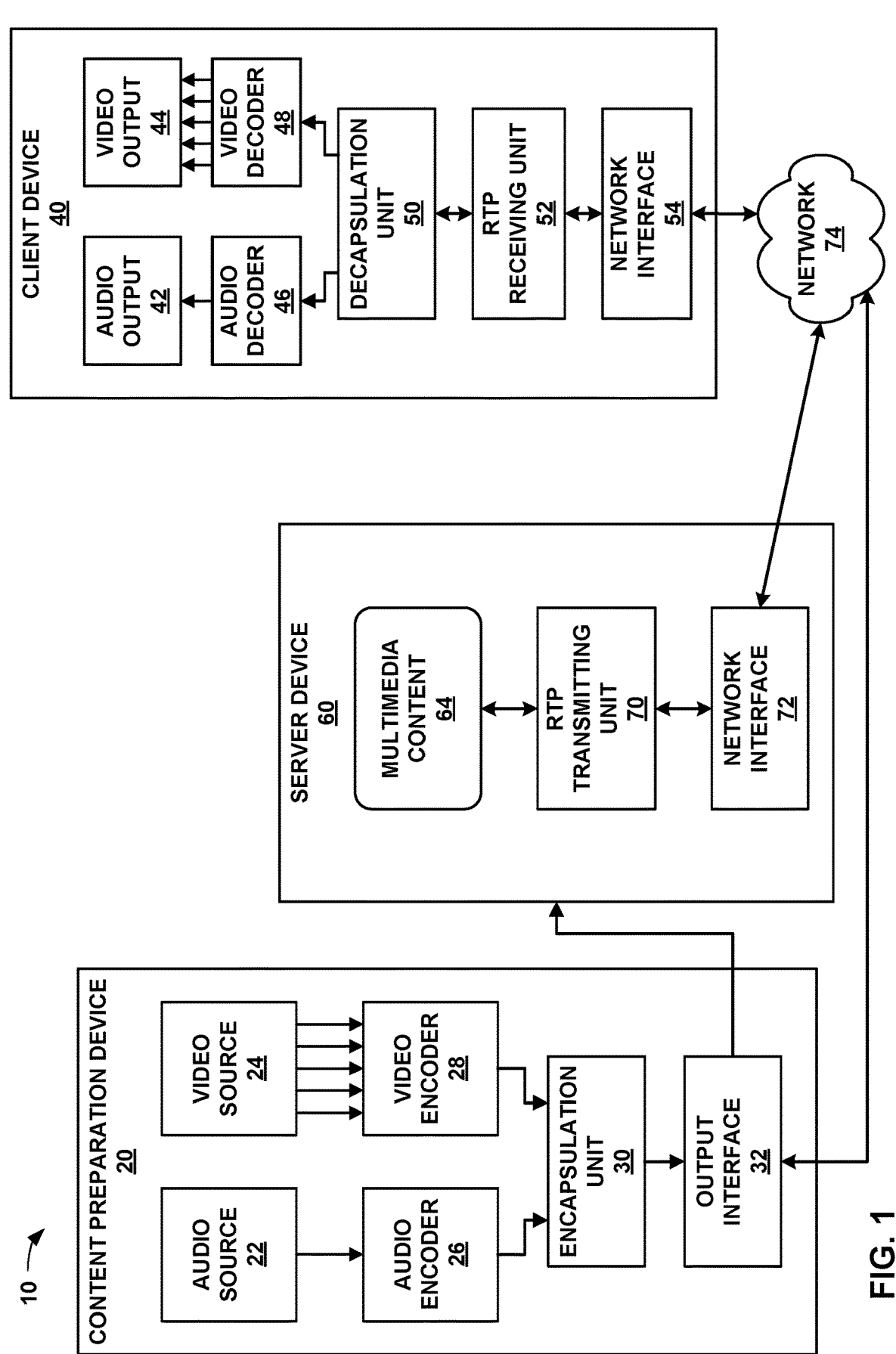
FIG. 1 is a block diagram illustrating an example system that implements techniques for streaming media data over a network.

In general, this disclosure describes techniques for protecting content (e.g., images, virtual object data, audio data, or other content) exchanged during an augmented reality (AR) or other extended reality (XR) call, such as a mixed reality (MR) or virtual reality (VR) call.

GL Transmission Format 2.0 (glTF2) may be used as a scene description format to address needs of MPEG-I (Moving Pictures Experts Group—Immersive) and 6 DoF (Six Degrees of Freedom) applications. Specifying extensions to glTF2 is described in, e.g., Khronos Group, The GL Transmission Format (glTF), version 2.0, github.com/Khronos-Group/glTF/tree/master/specification/2.0#specifying-extensions.

In general, glTF2 may include data describing static or dynamic scenes. With respect to the techniques of this disclosure, glTF2 can be used to describe a scene including dynamic media data, such as audio, video, and XR/AR/MR/VR data. For example, a three-dimensional rendered scene may include an object, such as a display screen or other object, that presents video data. Likewise, the three-dimensional rendered scene may include an audio object positioned at a speaker in the three-dimensional rendered scene.

In an XR call, users may present themselves to others on the call using their own three-dimensional (3D) assets, such as 3D avatars, garments, AR affects, or the like. During an AR call or an AR experience in shared spaces, users may need to share their assets with other participants on the call. The AR call/experience may be described by a 3D scene that includes all participants. A gLTF 2.0 scene or scene update may represent the 3D scene. The assets are represented as 3D objects, such as meshes and/or point clouds.

Participants in the AR call/experience may receive a 3D representation of other call members assets. If unprotected, other users may make copies of these assets and use them after the AR call/experience for other purposes. In some cases, malicious users may even misuse the 3D assets to impersonate a participant in future AR calls/experiences or to otherwise misappropriate digital assets created by a user that may be protected as intellectual property, e.g., under copyright.

This disclosure describes techniques that may be used to encrypt 3D assets using a digital rights management (DRM) system, which allows for the acquisition of encryption keys during an AR call/experience. The usage of the DRM protection may be signaled in the scene description document through a glTF 2.0 extension.

In some examples, the DRM license contains a session key that is used by all participants to encrypt the encryption keys that they use for their assets. A signaling server, such as a WebRTC signaling server or IP Multimedia Core Network Subsystem (IMS) Proxy, Interrogating, or Serving Call Session Control Function (P/I/S-CSCF) may perform the tasks attributed to the DRM server.

In some examples, users (or user client software) may, at the beginning of an AR call/experience, send data permitting participants to receive their 3D assets to the DRM server. At the end of the call/experience, the user (or user client software) may inform the DRM server that a license to access their 3D assets is to be revoked.

In this manner, the techniques of this disclosure may be used to protect user digital assets exchanged during an AR (or other XR, e.g., MR or VR) call with one or more other users. Absent such protections, these digital assets may be vulnerable to misappropriation by malicious users who participate in such a call. By implementing these techniques, the problem of digital asset theft or other misappropriation, which specifically arises in the realm of computer-based technologies, such as XR/AR/VR/MR calls, can be overcome through a solution that is rooted in computer-based technology.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a media presentation. For example, the coded video or audio part of the media presentation can be an elementary stream. An elementary stream may be converted into a packetized elementary stream (PES) before being encapsulated within a video file. Within the same media presentation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into streamable media data.

Encapsulation unit 30 receives PES packets for elementary streams of a media presentation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (chg., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

Content preparation device 20 may prepare a GL Transmission Format 2.0 (glTF2) bitstream including one or more timed media objects, such as audio and video objects. In particular, content preparation device 20 (e.g., encapsulation unit 30 thereof) may prepare a glTF2 scene description for the glTF2 bitstream indicating the presence of a timed media object, a position of the timed media object in a presentation environment (e.g., a three-dimensional space navigable by a user in, e.g., virtual reality, a video game, or other rendered virtual environment). The timed media object may also be associated with a presentation time, such that client device 40 can present the timed media object at a current time for the timed media object. For example, content preparation device 20 may capture audio and video data live and stream the live-captured audio and video data to client device 40 in real time. The scene description data may indicate that the timed media object is stored on server device 60 or another remote device relative to client device 40, or that the timed media object is included in the glTF2 bitstream or otherwise already present on client device 40.

According to the techniques of this disclosure, client device 40 may also include elements of content preparation device 20, in order to prepare content to be distributed to other client devices (not shown) via network 74. Server device 60 may include one or more components for a digital rights management (DRM) server, as discussed in greater detail below. In some examples, client device 40 may send content (e.g., user movement information, user viewport orientation information, user interaction information, e.g., button presses or interactions with 3D objects of a virtual scene, or the like, as well as audio, video, and/or 3D object content) to server device 60 to be distributed to other client devices participating in an AR call. In other examples, client device 40 may send the content directly to the other client devices participating in the AR call.

Client device 40 may receive a glTF scene description that has been extended according to the techniques of this disclosure at a glTF node, mesh, or primitive. The extension can also be associated with textures, maps (e.g., normal maps, height map, bump maps, or the like), shaders, lights, or other 3D assets. The glTF extension may indicate that all attribute data of the associated primitive, mesh, or node will be encrypted. If added at the node level, all attributes of the mesh primitives may be encrypted. Alternatively, only a subset of the attribute data may be encrypted. The encrypted attributes may then be signaled explicitly. In some examples, the signaling is associated with a buffer element. Being associated with a buffer element makes the signaling generic to all types of media data.

Client device 40 may retrieve the glTF2 bitstream including the scene description including data describing the timed media object, such as a location from which the timed media object can be retrieved, a position of the timed media object in the presentation environment, and a presentation time for the timed media object. In this manner, client device 40 may retrieve current timed media data for the timed media object for a current presentation time and present the timed media data at the proper position in the presentation environment and at the current playback time.

According to the techniques of this disclosure, client device 40 may receive the glTF scene description to determine one or more 3D assets of the scene that are encrypted or otherwise protected. Client device 40 may further determine how to decrypt the 3D assets, e.g., from the glTF scene description. For example, client device 40 may receive an encryption key from server device 60, or another server device, according to WebRTC signaling or IMS P/I/S-CSCF. Client device 40 may then use the encryption key to decrypt the 3D assets and present the decrypted 3D assets during the call to the user of client device 40.

Client device 40 may be configured to instantiate a circular buffer in a memory thereof (not shown in FIG. 1). Audio decoder 46 and video decoder 48 may store frames of audio or video data to the circular buffer, and audio output 42 and video output 44 may extract the frames from the circular buffer. For example, audio output 42, video output 44, audio decoder 46, and video decoder 48 may maintain read and write pointers into the circular buffer, where audio decoder 46 and video decoder 48 may store a decoded frame at the write pointer, then advance the write pointer, while audio output 42 and video output 44 may extract a decoded frame at the read pointer and then advance the read pointer. Moreover, client device 40 may prevent the read pointer from exceeding the write pointer, and the write pointer from overtaking the read pointer, to prevent buffer overflow and underflow.

Server device 60 includes Real-time Transport Protocol (RTP) transmitting unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64 and include components that conform substantially to those of server device 60. In general, network interface 72 is configured to send and receive data via network 74.

RTP transmitting unit 70 is configured to deliver media data to client device 40 via network 74 according to RTP, which is standardized in Request for Comment (RFC) 3550 by the Internet Engineering Task Force (IETF). RTP transmitting unit 70 may also implement protocols related to RTP, such as RTP Control Protocol (RTCP), Real-time Streaming Protocol (RTSP), Session Initiation Protocol (SIP), and/or Session Description Protocol (SDP). RTP transmitting unit 70 may send media data via network interface 72, which may implement Uniform Datagram Protocol (UDP) and/or Internet protocol (IP). Thus, in some examples, server device 60 may send media data via RTP and RTSP over UDP using network 74.

RTP transmitting unit 70 may receive an RTSP describe request from, e.g., client device 40. The RTSP describe request may include data indicating what types of data are supported by client device 40. RTP transmitting unit 70 may respond to client device 40 with data indicating media streams, such as media content 64, that can be sent to client device 40, along with a corresponding network location identifier, such as a uniform resource locator (URL) or uniform resource name (URN).

RTP transmitting unit 70 may then receive an RTSP setup request from client device 40. The RTSP setup request may generally indicate how a media stream is to be transported. The RTSP setup request may contain the network location identifier for the requested media data (e.g., media content 64) and a transport specifier, such as local ports for receiving RTP data and control data (e.g., RTCP data) on client device 40. RTP transmitting unit 70 may reply to the RTSP setup request with a confirmation and data representing ports of server device 60 by which the RTP data and control data will be sent. RTP transmitting unit 70 may then receive an RTSP play request, to cause the media stream to be "played," i.e., sent to client device 40 via network 74. RTP transmitting unit 70 may also receive an RTSP teardown request to end the streaming session, in response to which, RTP transmitting unit 70 may stop sending media data to client device 40 for the corresponding session.

RTP receiving unit 52, likewise, may initiate a media stream by initially sending an RTSP describe request to server device 60. The RTSP describe request may indicate types of data supported by client device 40. RTP receiving unit 52 may then receive a reply from server device 60 specifying available media streams, such as media content 64, that can be sent to client device 40, along with a corresponding network location identifier, such as a uniform resource locator (URL) or uniform resource name (URN).

RTP receiving unit 52 may then generate an RTSP setup request and send the RTSP setup request to server device 60. As noted above, the RTSP setup request may contain the network location identifier for the requested media data (e.g., media content 64) and a transport specifier, such as local ports for receiving RTP data and control data (e.g., RTCP data) on client device 40. In response, RTP receiving unit 52 may receive a confirmation from server device 60, including ports of server device 60 that server device 60 will use to send media data and control data.

After establishing a media streaming session between server device 60 and client device 40, RTP transmitting unit 70 of server device 60 may send media data (e.g., packets of media data) to client device 40 according to the media streaming session. Server device 60 and client device 40 may exchange control data (e.g., RTCP data) indicating, for example, reception statistics by client device 40, such that server device 60 can perform congestion control or otherwise diagnose and address transmission faults.

Network interface 54 may receive and provide media of a selected media presentation to RTP receiving unit 52, which may in turn provide the media data to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, RTP receiving unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, RTP receiving unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via RTP receiving unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
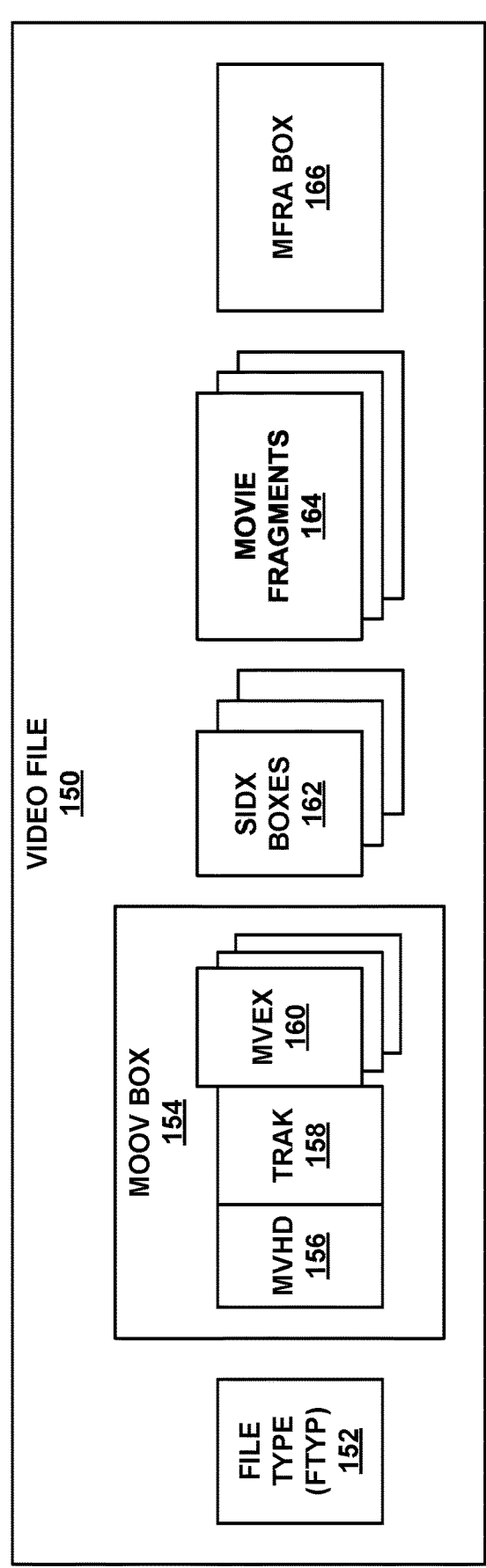
FIG. 2 is a block diagram illustrating elements of an example video.

FIG. 2 is a block diagram illustrating elements of an example video file 150. As described above, video files in accordance with the ISO base media file format and extensions thereof store data in a series of objects, referred to as "boxes." In the example of FIG. 2, video file 150 includes file type (FTYP) box 152, movie (MOOV) box 154, segment index (sidx) boxes 162, movie fragment (MOOF) boxes 164, and movie fragment random access (MFRA) box 166. Although FIG. 2 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

MOOV box 154, in the example of FIG. 2, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 2). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., nonhint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 3:
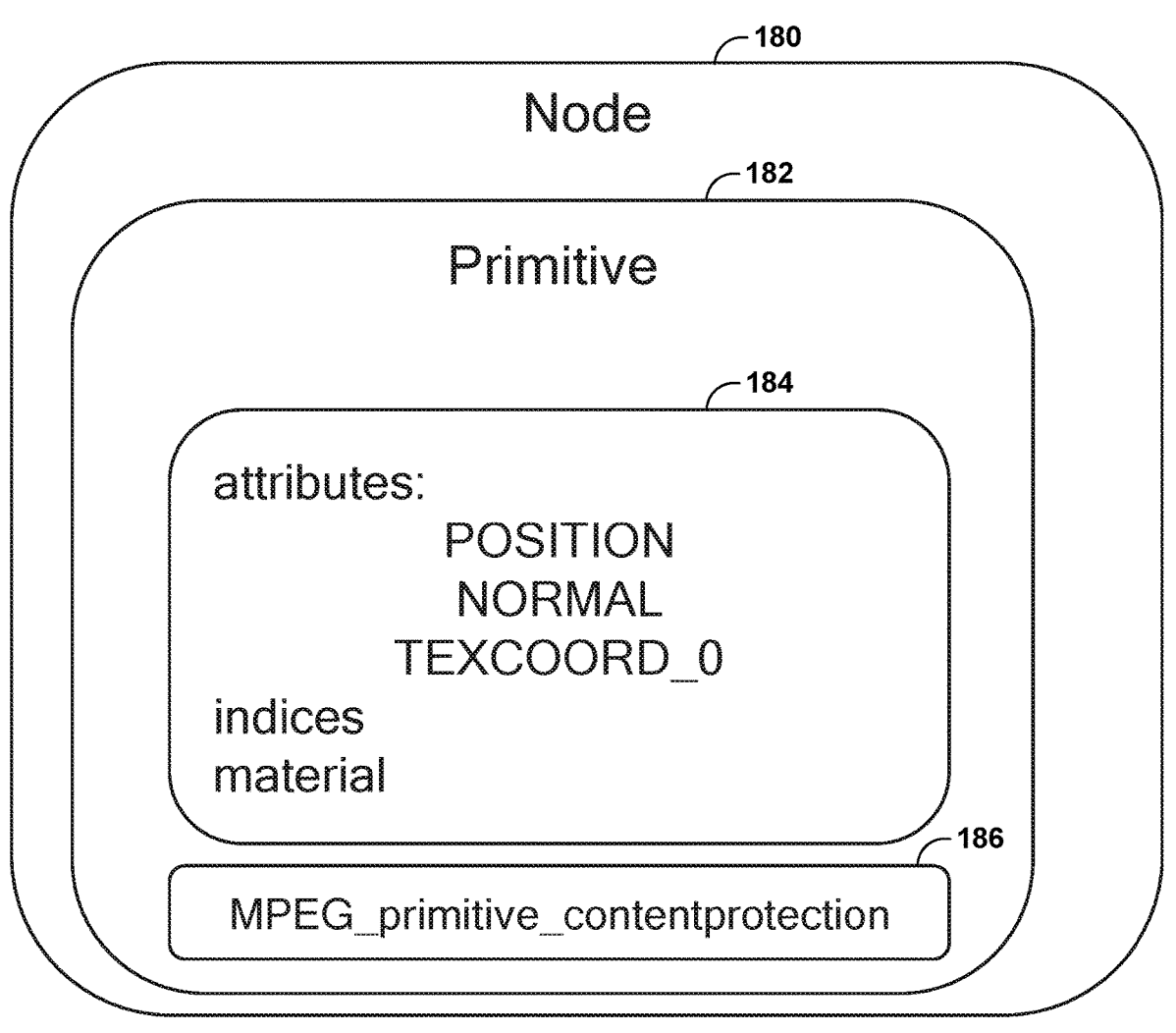
FIG. 3 is a conceptual diagram illustrating an example extension to a primitive element of a glTF scene description.

FIG. 3 is a conceptual diagram illustrating an example extension to a primitive element of a glTF scene description. In this example, node element 180 includes primitive element 182. Node element 180 may include one or more such primitive elements. Additionally or alternatively, a protected asset may include multiple nodes 180. Primitive element 182 may represent a graphical primitive, such as a triangle or other geometric shape bounded by vertices and edges in a 3D mesh. Primitive element 182 includes attributes 184, such as a position (describing a 3D position of the corresponding primitive), normal (describing a surface normal direction for the corresponding primitive), texture coordinates (describing a texture for the corresponding primitive), various indices, and a material (e.g., color and surface shading information for the corresponding primitive).

The data of FIG. 3 may be stored as metadata items, and not necessarily in an ISO base media file format file, such as that of FIG. 2. In some examples, the data of FIG. 3 may be stored as metadata of an ISO base media file format file, as metadata of a scene description, as metadata of an independent file, or elsewhere.

Additionally, in this example, primitive element 182 includes content protection information 186. Per the techniques of this disclosure, content protection information 186 may describe a content protection scheme for the corresponding primitive, such as a scheme identifier (schemeId), an address for a DRM server, a network location of a key to be used to decrypt protected data, and which data is protected (e.g., which of the attributes are encrypted). The following pseudocode represents an example set of data that may be used to represent primitive element 182 according to the techniques of this disclosure:

```
{
    "name": "mesh.001",
    "primitives": [  {
        "attributes": {
            "NORMAL": 4,
            "POSITION": 3
        },
        "indices": 5,
        "material": 1,
        "extensions": {
            "MPEG_primitive_contentprotection": {
                "schemeId": "urn:mpeg:sd:gltfprotection:2023",
                "drmServer": "https://example.com/drm/authorize",
                "protectedContentKey": "https://example.com/user1/key1",
                "protectedData": {"attributes": ["POSITION", "NORMAL",
"TEXCOORD_0", "JOINTS_0"], "indices"}
            }
        }
    }
    ]
}
```

Figure 4:
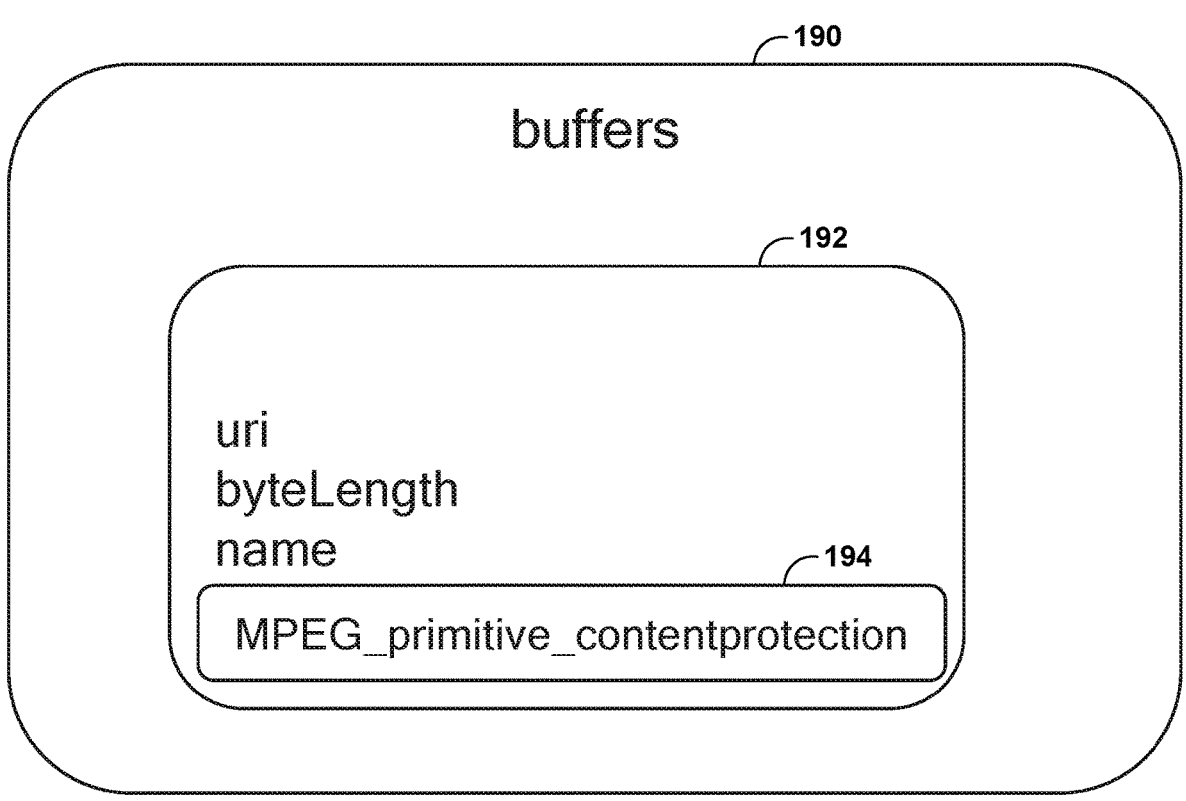
FIG. 4 is a conceptual diagram illustrating an example extension to a buffer element of a glTF scene description.

FIG. 4 is a conceptual diagram illustrating an example extension to a buffer element of a glTF scene description. In this example, buffers element 190 includes buffer element 192. Buffer element 192 includes a uniform resource identifier (URI), a byte length (byteLength) value, and a name value, as well as content protection information 194. The following pseudocode represents an example set of data that may be used to represent buffer element 192 according to the techniques of this disclosure:

```
"buffers": [
    {
        "name": "buffer.001",
        "uri": "https://example.com/databuffer",
        "byteLength": 654321654,
        "extensions": {
            "MPEG_primitive_contentprotection": {
                "schemeId": "urn:mpeg:sd:gltfprotection:2023",
                "drmServer": "https://example.com/drm/authorize",
                "protectedContentKey": "https://example.com/user1/key1",
            }
        }
    }
]
```

Figure 5:
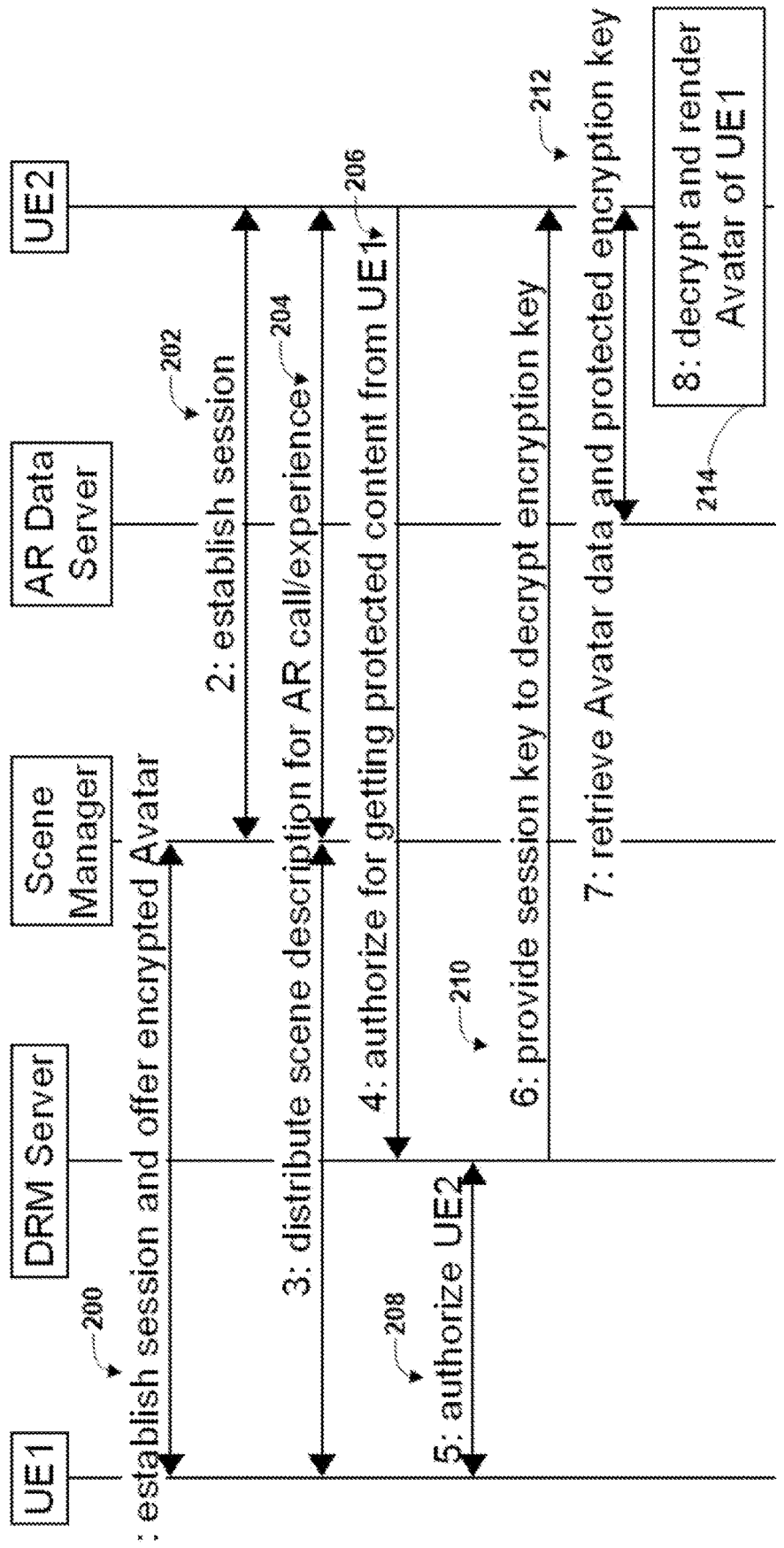
FIG. 5 is a flow diagram illustrating an example method of encrypting and decrypting 3D assets for an augmented reality (AR) call according to the techniques of this disclosure.

FIG. 5 is a flow diagram illustrating an example method of encrypting and decrypting 3D assets for an AR call according to the techniques of this disclosure. In this example, participants in the method include two user equipment (UE) devices, labeled "UE1" and "UE2." Each of the UE devices may include components similar to those of client device 40 and content preparation device 20 of FIG. 1. In the example of FIG. 5, additional participants include a DRM Server, a Scene Manager, and an AR Data Server. Each of these elements may be included in different server devices, in the same server device, or in any combination of common or distinct servers. The servers may be physical servers, virtual servers, or any combination thereof.

In this example, initially, UE 1 and the scene manager establish a communication session, and UE 1 may offer an encrypted avatar (or other digital asset) to the scene manager (200). The scene manager and UE 2 may then establish a communication session (202). The scene manager may then distribute a scene description for an AR call/experience including both UE 1 and UE 2 to UE 1 and UE 2 (204). In accordance with the techniques of this disclosure, the scene description may include data representing content protection for the avatar from UE 1, e.g., an extension to a primitive element per the techniques described with respect to FIG. 3 or an extension to a buffers element per the techniques described with respect to FIG. 4.

UE 2 may then obtain authorization from the DRM Server for obtaining protected content from UE 1 (206). The DRM server may determine that UE 1 has authorized UE 2 to access the protected content (208). The DRM server may then provide a session key to decrypt an encryption key used to encrypt the protected content from UE 1 to UE 2 (210). UE 2 may then retrieve the avatar data from AR data server and a protected encryption key to decrypt the avatar data (212). UE 2 may then decrypt and render the avatar of UE 1 (214).

UE 1 may authorize other users, such as UE 2, or other participants of the AR call in various ways. In some examples, UE 1 may receive a request from a DRM server and check that UE 1 is in an AR session with UE 2. In some examples, UE 1 may inform the DRM server about a shared session secret/token and use information, such as an IP address or session information protocol (SIP) information, to identify other authorized participants. In some examples, UE 1 may provide a contact list to the DRM server as a list of pre-authorized users.

The AR data server may use similar data to that of the DRM server to authenticate UE 2. That is, the AR data server may authenticate UE 2. For example, the AR data server may receive a session key from UE 2 and use the session key to authenticate UE 2 as a valid participant in the AR call. Additionally or alternatively, the AR data server may receive a shared session token for the AR call, where the shared session token is shared by UE 1 and UE 2 (and any other authentic participants of the AR call). The AR data server may use the shared session token to authenticate UE 2 as a valid participant in the AR call. Additionally or alternatively, the AR data server may receive a list of participants in the AR call indicating that each of the participants in the list of participants is authorized to access the one or more protected digital assets, and when the list of participants includes UE 2, authenticate UE 2 as a valid participant in the AR call.

In this manner, the techniques of this disclosure allow for the protection of 3D assets during AR calls and shared experiences. A DRM system may be used to ensure assets are used only during the lifetime of the AR session. The assets may be encrypted only once with a secret key. A session key may be used to decrypt the secret key, and the secret may in turn be used to decrypt the 3D asset in a trusted DRM environment.

Figure 6:
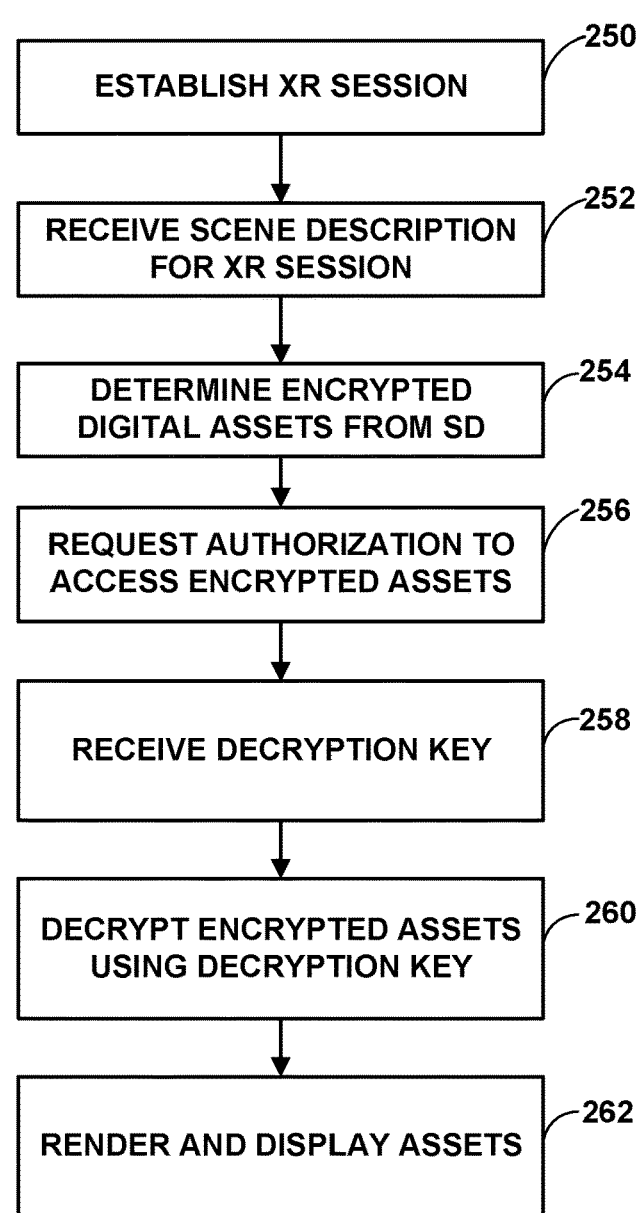
FIG. 6 is a flowchart illustrating an example method of exchanging protected digital assets for an augmented reality (AR) call according to the techniques of this disclosure.

FIG. 6 is a flowchart illustrating an example method of exchanging protected digital assets for an augmented reality (AR), such as an extensible reality (XR), call according to the techniques of this disclosure. In particular, FIG. 6 may be performed by a client device (such as a user equipment (UE) device) involved in the AR call. The client device may be a device configured to retrieve and use one or more protected (e.g., encrypted) digital assets, such as an avatar for another user participating in the AR call.

Initially, the client device may establish an XR session with one or more other devices (250). At least one of the other devices may include 3D object model data, such as avatar data, that is protected (e.g., encrypted). The client device may receive a scene description for the XR session (252). The client device may then determine one or more encrypted digital assets of the XR session from the scene description (254). Thus, the client device may request authorization to access the encrypted assets (256). For example, the client device may send the request to a digital rights management (DRM) server associated with the XR session. A network address for the DRM server, such as a URL for the DRM server, may be included in the scene description.

In response to the request, assuming the DRM server authenticates the client device, the client device may receive a decryption key (258) to be used to decrypt the protected (encrypted) assets. The decryption key may be a session key that is used to encrypt all protected assets (or keys associated with the protected assets) for the XR session. For example, the same key may be used to both encrypt and decrypt the protected assets, and the key itself may be encrypted using the session key. In this manner, only those devices that are engaged in the XR session may be sent the session key, such that only those devices engaged in the XR session are able to decrypt the key used to decrypt the protected assets using the session key.

The client device may then decrypt the encrypted assets using the decryption key (260). Ultimately, the client device may render and display the assets (262).

In this manner, the method of FIG. 6 represents an example of a method including receiving a scene description for an AR call, the scene description including data representing one or more digital assets for the AR call that are encrypted; requesting authorization to access the one or more digital assets for the AR call that are encrypted; in response to requesting authorization, receiving data for a key to be used to decrypt the one or more digital assets; decrypting the one or more digital assets using the data for the key to form decrypted digital assets; and rendering the decrypted digital assets during the AR call.

Figure 7:
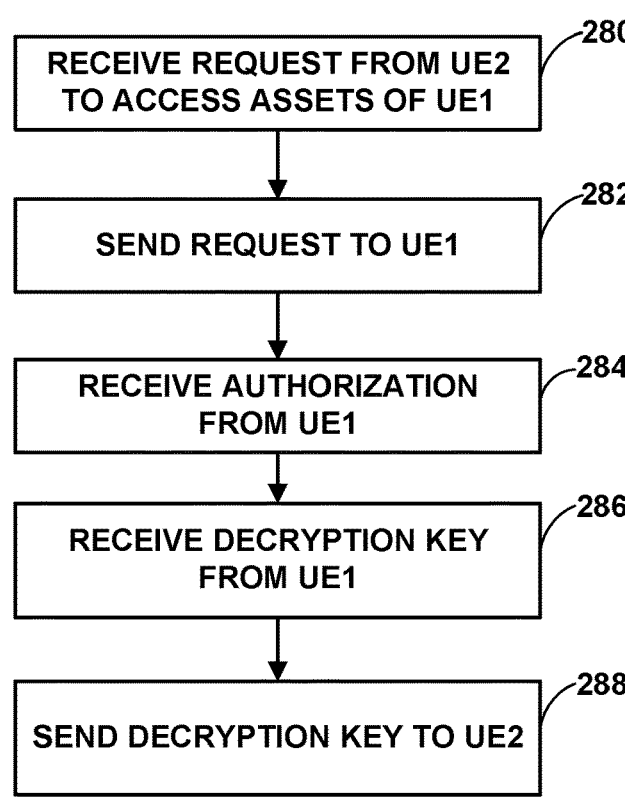
FIG. 7 is a conceptual diagram illustrating an example method of exchanging protected digital assets for an augmented reality (AR) call according to the techniques of this disclosure.

FIG. 7 is a conceptual diagram illustrating an example method of exchanging protected digital assets for an augmented reality (AR) call according to the techniques of this disclosure. In particular, the method of FIG. 7 may be performed by a DRM server to authenticate devices involved in an extended reality (XR) session (e.g., the AR call), and to distribute decryption keys to the authenticated devices to decrypt protected digital assets of the XR session.

Initially, the DRM server may receive a request from a second client device (e.g., UE2) to access assets of a first client device (e.g., UE1) (280). The DRM server may send the request to the first client device/UE1 (282). The DRM server may receive a response from the first client device including an authorization for the second client device/UE2 to access the assets (284). In some examples, the authorization may itself be a decryption key, whereas in other examples, the DRM server may separately receive the decryption key from the first client device/UE1 (286). The DRM server may then send the decryption key to the second client device (288).

In this manner, the method of FIG. 7 represents an example of a method including receiving a request, from a first client device participating in the AR call, to access one or more protected digital assets of a second client device participating in the AR call; receiving, from the second client device, authorization to provide access to the one or more protected digital assets to the first client device; and in response to the authorization from the second client device, providing, to the first client device, a decryption key associated with the one or more protected digital assets.

Various examples of the techniques of this disclosure are summarized in the following clauses:

Clause 1: A method of participating in an augmented reality (AR) call, the method comprising: receiving a scene description for an AR call, the scene description including data representing one or more digital assets for the AR call that are encrypted; requesting authorization to access the one or more digital assets for the AR call that are encrypted; in response to requesting authorization, receiving data for a key to be used to decrypt the one or more digital assets; decrypting the one or more digital assets using the data for the key to form decrypted digital assets; and rendering the decrypted digital assets during the AR call.

Clause 2: The method of clause 1, wherein requesting authorization to access the one or more digital assets comprises sending a request to a digital rights management (DRM) server.

Clause 3: The method of clause 2, wherein the scene description includes information associating the DRM server with the one or more digital assets.

Clause 4: The method of any of clauses 2 and 3, wherein the scene description includes a uniform resource indicator (URI) or uniform resource locator (URL) for the DRM server.

Clause 5: The method of any of clauses 1-4, wherein the data for the key comprises a session key, and wherein decrypting the one or more digital assets comprises: using the session key to decrypt an encrypted version of an encryption key to form a decrypted encryption key; and using the decrypted encryption key to decrypt the one or more digital assets.

Clause 6: The method of clause 5, further comprising extracting the encrypted version of the encryption key from the scene description.

Clause 7: The method of any of clauses 1-6, further comprising retrieving the one or more digital assets from an AR data server.

Clause 8: The method of clause 1, wherein requesting authorization to access the one or more digital assets comprises sending a request to a digital rights management (DRM) server.

Clause 9: The method of clause 8, wherein the scene description includes information associating the DRM server with the one or more digital assets.

Clause 10: The method of clause 8, wherein the scene description includes a uniform resource indicator (URI) or uniform resource locator (URL) for the DRM server.

Clause 11: The method of clause 1, wherein the data for the key comprises a session key, and wherein decrypting the one or more digital assets comprises: using the session key to decrypt an encrypted version of an encryption key to form a decrypted encryption key; and using the decrypted encryption key to decrypt the one or more digital assets.

Clause 12: The method of clause 11, further comprising extracting the encrypted version of the encryption key from the scene description.

Clause 13: The method of clause 1, further comprising retrieving the one or more digital assets from an AR data server.

Clause 14: A method of participating in an augmented reality (AR) call, the method comprising: encrypting one or more digital assets for an AR call; providing the one or more digital assets to a scene manager for the AR call; and providing data representing one or more participants in the AR call that are authorized to access the one or more digital assets.

Clause 15: A method comprising a combination of the method of any of clauses 1-7 and the method of clause 14.

Clause 16: The method of any of clauses 14 and 15, wherein encrypting the one or more digital assets comprises encrypting the one or more digital assets using an encryption key.

Clause 17: The method of clause 16, further comprising: receiving a session key from a digital rights management (DRM) server; encrypting the encryption key using the session key to form an encrypted version of the encryption key; and providing the encrypted version of the encryption key to the scene manager.

Clause 18: The method of any of clauses 14-17, wherein providing the data representing the one or more participants in the AR call that are authorized to access the one or more digital assets comprises: receiving a request from a digital rights management (DRM) server identifying a participant in the AR call; and sending data to the DRM server indicating that the participant is authorized.

Clause 19: The method of any of clauses 14-17, wherein providing the data representing the one or more participants in the AR call that are authorized to access the one or more digital assets comprises sending a shared session token for the AR call to a digital rights management (DRM) server.

Clause 20: The method of any of clauses 14-17, wherein providing the data representing the one or more participants in the AR call that are authorized to access the one or more digital assets comprises sending a list of participants in the AR call to a digital rights management (DRM) server indicating that each of the participants in the list of participants is authorized to access the one or more digital assets.

Clause 21: The method of any of clauses 14-20, wherein providing the data representing the one or more participants in the AR call that are authorized to access the one or more digital assets comprises providing identifying information for the one or more participants, the identifying information comprising one of an Internet Protocol (IP) address or session information protocol (SIP) information.

Clause 22: The method of clause 14, wherein encrypting the one or more digital assets comprises encrypting the one or more digital assets using an encryption key.

Clause 23: The method of clause 22, further comprising: receiving a session key from a digital rights management (DRM) server; encrypting the encryption key using the session key to form an encrypted version of the encryption key; and providing the encrypted version of the encryption key to the scene manager.

Clause 24: The method of clause 14, wherein providing the data representing the one or more participants in the AR call that are authorized to access the one or more digital assets comprises: receiving a request from a digital rights management (DRM) server identifying a participant in the AR call; and sending data to the DRM server indicating that the participant is authorized.

Clause 25: The method of clause 14, wherein providing the data representing the one or more participants in the AR call that are authorized to access the one or more digital assets comprises sending a shared session token for the AR call to a digital rights management (DRM) server.

Clause 26: The method of clause 14, wherein providing the data representing the one or more participants in the AR call that are authorized to access the one or more digital assets comprises sending a list of participants in the AR call to a digital rights management (DRM) server indicating that each of the participants in the list of participants is authorized to access the one or more digital assets.

Clause 27: The method of clause 14, wherein providing the data representing the one or more participants in the AR call that are authorized to access the one or more digital assets comprises providing identifying information for the one or more participants, the identifying information comprising one of an Internet Protocol (IP) address or session information protocol (SIP) information.

Clause 28: A device for participating in an augmented reality (AR) call, the device comprising one or more means for performing the method of any of clauses 1-27.

Clause 29: The device of clause 28, wherein the one or more means comprise one or more processors implemented in circuitry.

Clause 30: The device of any of clauses 28 and 29, wherein the one or more means comprise a memory for storing one or more digital assets.

Clause 31: The device of any of clauses 28-30, wherein the apparatus comprises at least one of: an integrated circuit; a microprocessor; or a wireless communication device.

Clause 32: A computer-readable storage medium having stored thereon instructions that, when executed, cause a processor to perform the method of any of clauses 1-21.

Clause 33: A device for participating in an augmented reality (AR) call, the device comprising: means for receiving a scene description for an AR call, the scene description including data representing one or more digital assets for the AR call that are encrypted; means for requesting authorization to access the one or more digital assets for the AR call that are encrypted; means for receiving data for a key to be used to decrypt the one or more digital assets in response to requesting authorization; means for decrypting the one or more digital assets using the data for the key to form decrypted digital assets; and means for rendering the decrypted digital assets during the AR call.

Clause 34: A device for participating in an augmented reality (AR) call, the device comprising: means for encrypting one or more digital assets for an AR call; means for providing the one or more digital assets to a scene manager for the AR call; and means for providing data representing one or more participants in the AR call that are authorized to access the one or more digital assets.

Clause 35: A method of participating in an augmented reality (AR) call, the method comprising: receiving a scene description for an AR call, the scene description including data representing one or more digital assets for the AR call that are encrypted; requesting authorization to access the one or more digital assets for the AR call that are encrypted; in response to requesting authorization, receiving data for a key to be used to decrypt the one or more digital assets; decrypting the one or more digital assets using the data for the key to form decrypted digital assets; and rendering the decrypted digital assets during the AR call.

Clause 36: The method of clause 35, wherein requesting authorization to access the one or more digital assets comprises sending a request to a digital rights management (DRM) server.

Clause 37: The method of clause 36, wherein the scene description includes information associating the DRM server with the one or more digital assets.

Clause 38: The method of clause 36, wherein the scene description includes a uniform resource indicator (URI) or uniform resource locator (URL) for the DRM server.

Clause 39: The method of clause 35, wherein the data for the key comprises a session key, and wherein decrypting the one or more digital assets comprises: using the session key to decrypt an encrypted version of an encryption key to form a decrypted encryption key; and using the decrypted encryption key to decrypt the one or more digital assets.

Clause 40: The method of clause 39, further comprising extracting the encrypted version of the encryption key from the scene description.

Clause 41: The method of clause 35, further comprising retrieving the one or more digital assets from an AR data server.

Clause 42: The method of clause 35, wherein the one or more digital assets comprise one or more GL Transmission Format 2.0 (gITF2) nodes, meshes, primitives, textures, normal maps, height maps, bump maps, shaders, or lights.

Clause 43: A device for participating in an augmented reality (AR) call, the device comprising: a memory configured to store AR data; and a processing system comprising one or more processors implemented in circuitry, the processing system being configured to: receive a scene description for an AR call, the scene description including data representing one or more digital assets for the AR call that are encrypted; request authorization to access the one or more digital assets for the AR call that are encrypted; in response to requesting authorization, receive data for a key to be used to decrypt the one or more digital assets; decrypt the one or more digital assets using the data for the key to form decrypted digital assets; and render the decrypted digital assets during the AR call.

Clause 44: The device of clause 43, wherein to request authorization to access the one or more digital assets, the processing system is configured to send a request to a digital rights management (DRM) server.

Clause 45: The device of clause 44, wherein the scene description includes information associating the DRM server with the one or more digital assets.

Clause 46: The device of clause 44, wherein the scene description includes a uniform resource indicator (URI) or uniform resource locator (URL) for the DRM server.

Clause 47: The device of clause 43, wherein the data for the key comprises a session key, and wherein to decrypt the one or more digital assets, the processing system is configured to: use the session key to decrypt an encrypted version of an encryption key to form a decrypted encryption key; and use the decrypted encryption key to decrypt the one or more digital assets.

Clause 48: The device of clause 47, wherein the processing system is further configured to extract the encrypted version of the encryption key from the scene description.

Clause 49: The device of clause 43, wherein the processing system is further configured to retrieve the one or more digital assets from an AR data server.

Clause 50: The device of clause 43, wherein the device comprises one or more of a camera, a computer, a mobile device, a broadcast receiver device, or a set-top box.

Clause 51: The device of clause 43, further comprising a display configured to display the rendered digital assets.

Clause 52: A method of participating in an augmented reality (AR) call, the method comprising: receiving a request, from a first client device participating in the AR call, to access one or more protected digital assets of a second client device participating in the AR call; receiving, from the second client device, authorization to provide access to the one or more protected digital assets to the first client device; and in response to the authorization from the second client device, providing, to the first client device, a decryption key associated with the one or more protected digital assets.

Clause 53: The method of clause 52, further comprising receiving the decryption key from the first client device.

Clause 54: The method of clause 52, wherein receiving the authorization comprises receiving data representing one or more participants in the AR call that are authorized to access the one or more protected digital assets from the second client device.

Clause 55: The method of clause 52, wherein receiving the authorization comprises receiving a shared session token for the AR call, the shared session token being shared by the first client device and the second client device.

Clause 56: The method of clause 52, wherein receiving the authorization comprises receiving a list of participants in the AR call indicating that each of the participants in the list of participants is authorized to access the one or more protected digital assets, the list of participants including the first client device.

Clause 57: The method of clause 52, wherein receiving the authorization comprises receiving identifying information for first client device, the identifying information comprising one of an Internet Protocol (IP) address or session information protocol (SIP) information.

Clause 58: A device for participating in an augmented reality (AR) call, the device comprising: a memory configured to store decryption keys; and a processing system comprising one or more processors implemented in circuitry, the processing system being configured to: receive a request, from a first client device participating in the AR call, to access one or more protected digital assets of a second client device participating in the AR call; receive, from the second client device, authorization to provide access to the one or more protected digital assets to the first client device; and in response to the authorization from the second client device, provide, to the first client device, a decryption key of the decryption keys, the decryption key being associated with the one or more protected digital assets.

Clause 59: The device of clause 58, wherein the processing system is further configured to receive the decryption key from the first client device.

Clause 60: The device of clause 58, wherein the processing system is configured to receive data representing one or more participants in the AR call that are authorized to access the one or more protected digital assets from the second client device.

Clause 61: The device of clause 58, wherein the processing system is configured to receive a shared session token for the AR call, the shared session token being shared by the first client device and the second client device.

Clause 62: The device of clause 58, wherein the processing system is configured to receive a list of participants in the AR call indicating that each of the participants in the list of participants is authorized to access the one or more protected digital assets, the list of participants including the first client device.

Clause 63: The device of clause 58, wherein the processing system is configured to receive identifying information for first client device, the identifying information comprising one of an Internet Protocol (IP) address or session information protocol (SIP) information.

Clause 64: The device of clause 58, wherein the device comprises a digital rights management (DRM) server device.

Clause 65: A method of participating in an augmented reality (AR) call, the method comprising: receiving a scene description for an AR call, the scene description including data representing one or more digital assets for the AR call that are encrypted; requesting authorization to access the one or more digital assets for the AR call that are encrypted; in response to requesting authorization, receiving data for a key to be used to decrypt the one or more digital assets; decrypting the one or more digital assets using the data for the key to form decrypted digital assets; and rendering the decrypted digital assets during the AR call.

Clause 66: The method of clause 65, wherein requesting authorization to access the one or more digital assets comprises sending a request to a digital rights management (DRM) server.

Clause 67: The method of clause 66, wherein the scene description includes information associating the DRM server with the one or more digital assets.

Clause 68: The method of any of clauses 66 and 67, wherein the scene description includes a uniform resource indicator (URI) or uniform resource locator (URL) for the DRM server.

Clause 69: The method of any of clauses 66-68, wherein the data for the key comprises a session key, and wherein decrypting the one or more digital assets comprises: using the session key to decrypt an encrypted version of an encryption key to form a decrypted encryption key; and using the decrypted encryption key to decrypt the one or more digital assets.

Clause 70: The method of clause 69, further comprising extracting the encrypted version of the encryption key from the scene description.

Clause 71: The method of any of clauses 66-70, further comprising retrieving the one or more digital assets from an AR data server.

Clause 72: The method of any of clauses 66-71, wherein the one or more digital assets comprise one or more GL Transmission Format 2.0 (glTF2) nodes, meshes, primitives, textures, normal maps, height maps, bump maps, shaders, or lights.

Clause 73: A device for participating in an augmented reality (AR) call, the device comprising: a memory configured to store AR data; and a processing system comprising one or more processors implemented in circuitry, the processing system being configured to: receive a scene description for an AR call, the scene description including data representing one or more digital assets for the AR call that are encrypted; request authorization to access the one or more digital assets for the AR call that are encrypted; in response to requesting authorization, receive data for a key to be used to decrypt the one or more digital assets; decrypt the one or more digital assets using the data for the key to form decrypted digital assets; and render the decrypted digital assets during the AR call.

Clause 74: The device of clause 73, wherein to request authorization to access the one or more digital assets, the processing system is configured to send a request to a digital rights management (DRM) server.

Clause 75: The device of clause 74, wherein the scene description includes information associating the DRM server with the one or more digital assets.

Clause 76: The device of any of clauses 74 and 75, wherein the scene description includes a uniform resource indicator (URI) or uniform resource locator (URL) for the DRM server.

Clause 77: The device of any of clauses 73-76, wherein the data for the key comprises a session key, and wherein to decrypt the one or more digital assets, the processing system is configured to: use the session key to decrypt an encrypted version of an encryption key to form a decrypted encryption key; and use the decrypted encryption key to decrypt the one or more digital assets.

Clause 78: The device of clause 77, wherein the processing system is further configured to extract the encrypted version of the encryption key from the scene description.

Clause 79: The device of any of clauses 73-78, wherein the processing system is further configured to retrieve the one or more digital assets from an AR data server.

Clause 80: The device of any of clauses 73-79, wherein the device comprises one or more of a camera, a computer, a mobile device, a broadcast receiver device, or a set-top box.

Clause 81: The device of any of clauses 73-80, further comprising a display configured to display the rendered digital assets.

Clause 82: A method of participating in an augmented reality (AR) call, the method comprising: receiving a request, from a first client device participating in the AR call, to access one or more protected digital assets of a second client device participating in the AR call; receiving, from the second client device, authorization to provide access to the one or more protected digital assets to the first client device; and in response to the authorization from the second client device, providing, to the first client device, a decryption key associated with the one or more protected digital assets.

Clause 83: The method of clause 82, further comprising receiving the decryption key from the first client device.

Clause 84: The method of any of clauses 82 and 83, wherein receiving the authorization comprises receiving data representing one or more participants in the AR call that are authorized to access the one or more protected digital assets from the second client device.

Clause 85: The method of any of clauses 82-84, wherein receiving the authorization comprises receiving a shared session token for the AR call, the shared session token being shared by the first client device and the second client device.

Clause 86: The method of any of clauses 82-85, wherein receiving the authorization comprises receiving a list of participants in the AR call indicating that each of the participants in the list of participants is authorized to access the one or more protected digital assets, the list of participants including the first client device.

Clause 87: The method of any of clauses 82-86, wherein receiving the authorization comprises receiving identifying information for first client device, the identifying information comprising one of an Internet Protocol (IP) address or session information protocol (SIP) information.

Clause 88: A device for participating in an augmented reality (AR) call, the device comprising: a memory configured to store decryption keys; and a processing system comprising one or more processors implemented in circuitry, the processing system being configured to: receive a request, from a first client device participating in the AR call, to access one or more protected digital assets of a second client device participating in the AR call; receive, from the second client device, authorization to provide access to the one or more protected digital assets to the first client device; and in response to the authorization from the second client device, provide, to the first client device, a decryption key of the decryption keys, the decryption key being associated with the one or more protected digital assets.

Clause 89: The device of clause 88, wherein the processing system is further configured to receive the decryption key from the first client device.

Clause 90: The device of any of clauses 88 and 89, wherein the processing system is configured to receive data representing one or more participants in the AR call that are authorized to access the one or more protected digital assets from the second client device.

Clause 91: The device of any of clauses 88-90, wherein the processing system is configured to receive a shared session token for the AR call, the shared session token being shared by the first client device and the second client device.

Clause 92: The device of any of clauses 88-91, wherein the processing system is configured to receive a list of participants in the AR call indicating that each of the participants in the list of participants is authorized to access the one or more protected digital assets, the list of participants including the first client device.

Clause 93: The device of any of clauses 88-92, wherein the processing system is configured to receive identifying information for first client device, the identifying information comprising one of an Internet Protocol (IP) address or session information protocol (SIP) information.

Clause 94: The device of any of clauses 88-93, wherein the device comprises a digital rights management (DRM) server device.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving digital assets for an augmented reality (AR) call, the method comprising:
   receiving a scene description for an AR call, the scene description including data representing one or more encrypted digital assets for the AR call and an encrypted version of an encryption key for the one or more encrypted digital assets;
   extracting the encrypted version of the encryption key from the scene description;
   requesting authorization to access the one or more encrypted digital assets for the AR call;
   receiving data for the one or more encrypted digital assets;
   receiving a session key for the AR call;
   using the session key to decrypt the encrypted version of the encryption key to form a decrypted encryption key;
   using the decrypted encryption key to decrypt the one or more encrypted digital assets to form one or more digital assets; and
   rendering the one or more digital assets during the AR call.

2. The method of claim 1, wherein requesting authorization to access the one or more encrypted digital assets comprises sending a request to a digital rights management (DRM) server.

3. The method of claim 2, wherein the scene description includes information associating the DRM server with the one or more digital assets.

4. The method of claim 2, wherein the scene description includes a uniform resource indicator (URI) or uniform resource locator (URL) for the DRM server.

5. The method of claim 1, further comprising retrieving the one or more encrypted digital assets from an AR data server.

6. The method of claim 1, wherein the one or more digital assets comprise one or more GL Transmission Format 2.0 (glTF2) nodes, meshes, primitives, textures, normal maps, height maps, bump maps, shaders, or lights.

7. A device for retrieving digital assets for an augmented reality (AR) call, the device comprising:
   a memory configured to store AR data; and
   a processing system comprising one or more processors implemented in circuitry, the processing system being configured to:

receive a scene description for an AR call, the scene description including data representing one or more encrypted digital assets for the AR call and an encrypted version of an encryption key for the one or more encrypted digital assets;

extract the encrypted version of the encryption key from the scene description;

request authorization to access the one or more encrypted digital assets for the AR call;

receive data for the one or more digital assets;

receive a session key for the AR call;

use the session key to decrypt the encrypted version of the encryption key to form a decrypted encryption key;

use the decrypted encryption key to decrypt the one or more encrypted digital assets to form one or more digital assets; and render the one or more digital assets during the AR call.

8. The device of claim 7, wherein to request authorization to access the one or more encrypted digital assets, the processing system is configured to send a request to a digital rights management (DRM) server.

9. The device of claim 8, wherein the scene description includes information associating the DRM server with the one or more digital assets.

10. The device of claim 8, wherein the scene description includes a uniform resource indicator (URI) or uniform resource locator (URL) for the DRM server.

11. The device of claim 7, wherein the processing system is further configured to retrieve the one or more encrypted digital assets from an AR data server.

12. The device of claim 7, wherein the device comprises one or more of a camera, a computer, a mobile device, a broadcast receiver device, or a set-top box.

13. The device of claim 7, further comprising a display configured to display the rendered digital assets.

14. A non-transitory computer-readable storage medium having stored thereon instructions that, when executed, cause a processing system to:

receive a scene description for an augmented reality (AR) call, the scene description including data representing one or more encrypted digital assets for the AR call and an encrypted version of an encryption key for the one or more encrypted digital assets;

extract the encrypted version of the encryption key from the scene description;

request authorization to access the one or more encrypted digital assets for the AR call;

receive data for the one or more encrypted digital assets;

receive a session key for the AR call;

use the session key to decrypt the encrypted version of the encryption key to form a decrypted encryption key;

use the decrypted encryption key to decrypt the one or more encrypted digital assets to form one or more digital assets; and render the one or more digital assets during the AR call.

15. The non-transitory computer-readable storage medium of claim 14, wherein the instructions that cause the processing system to request authorization to access the one or more encrypted digital assets comprise instructions that cause the processing system to send a request to a digital rights management (DRM) server.

16. The non-transitory computer-readable storage medium of claim 15, wherein the scene description includes information associating the DRM server with the one or more digital assets.

17. The non-transitory computer-readable storage medium of claim 15, wherein the scene description includes a uniform resource indicator (URI) or uniform resource locator (URL) for the DRM server.

18. The non-transitory computer-readable storage medium of claim 14, further comprising instructions that cause the processing system to retrieve the one or more encrypted digital assets from an AR data server.

19. The non-transitory computer-readable storage medium of claim 14, wherein the one or more digital assets comprise one or more GL Transmission Format 2.0(glTF2) nodes, meshes, primitives, textures, normal maps, height maps, bump maps, shaders, or lights.

20. A device for retrieving digital assets for an augmented reality (AR) call, the device comprising:

means for receiving a scene description for an AR call, the scene description including data representing one or more encrypted digital assets for the AR call and an encrypted version of an encryption key for the one or more encrypted digital assets;

means for extracting the encrypted version of the encryption key from the scene description;

means for requesting authorization to access the one or more encrypted digital assets for the AR call;

means for receiving data for the one or more encrypted digital assets;

means for receiving a session key for the AR call;

means for using the session key to decrypt the encrypted version of the encryption key to form a decrypted encryption key;

means for using the decrypted encryption key to decrypt the one or more encrypted digital assets to form one or more digital assets; and means for rendering the one or more digital assets during the AR call.

21. The device of claim 20, wherein the means for requesting authorization to access the one or more encrypted digital assets comprises means for sending a request to a digital rights management (DRM) server.

22. The device of claim 21, wherein the scene description includes information associating the DRM server with the one or more digital assets.

23. The device of claim 21, wherein the scene description includes a uniform resource indicator (URI) or uniform resource locator (URL) for the DRM server.

24. The device of claim 20, further comprising means for retrieving the one or more encrypted digital assets from an AR data server.

25. The device of claim 20, wherein the one or more digital assets comprise one or more GL Transmission Format 2.0 (glTF2) nodes, meshes, primitives, textures, normal maps, height maps, bump maps, shaders, or lights.

* * * * *